United States Patent
Lorenz

(10) Patent No.: US 10,219,353 B1
(45) Date of Patent: Feb. 26, 2019

(54) Z-WAVE MULTI-WAY SWITCHES

(71) Applicant: Zbigniew Lorenz, Mt. Olive, NJ (US)

(72) Inventor: Zbigniew Lorenz, Mt. Olive, NJ (US)

(73) Assignee: Lorenz High Definition, LLC, Flanders, NJ (US)

( * ) Notice: Subject to any disclaimer, the term of this patent is extended or adjusted under 35 U.S.C. 154(b) by 0 days.

(21) Appl. No.: 16/013,446

(22) Filed: Jun. 20, 2018

(51) Int. Cl.
H05B 37/02 (2006.01)

(52) U.S. Cl.
CPC ..... *H05B 37/0227* (2013.01); *H05B 37/0263* (2013.01)

(58) Field of Classification Search
CPC ........ H05B 37/02; H05B 37/0254; H05B 37/0263; H05B 33/0845; H05B 37/0209; H05B 37/0218; H05B 37/0227; H05B 37/0245
USPC .................. 315/291, 295, 305, 362
See application file for complete search history.

(56) References Cited

U.S. PATENT DOCUMENTS

| | | | |
|---|---|---|---|
| 5,248,919 A | 9/1993 | Hanna et al. | |
| 5,905,442 A | 5/1999 | Mosebrook et al. | |
| 7,247,999 B2 | 7/2007 | Kumar | |
| 7,687,940 B2 | 3/2010 | Mosebrook et al. | |
| 7,772,724 B2 | 8/2010 | Mosebrook et al. | |
| 7,830,042 B2 | 11/2010 | Keagy et al. | |
| 7,847,440 B2 | 12/2010 | Mosebrook et al. | |
| 7,868,561 B2 * | 1/2011 | Weightman ............ | H05B 39/08 315/294 |
| 8,067,906 B2 | 11/2011 | Null | |
| 8,212,425 B2 | 7/2012 | Mosebrook et al. | |
| 9,326,407 B1 | 4/2016 | Musolin | |
| 2006/0250093 A1 | 11/2006 | Kumar | |
| 2007/0007826 A1 | 1/2007 | Mosebrook et al. | |
| 2007/0188025 A1 | 8/2007 | Keagy et al. | |
| 2008/0024074 A1* | 1/2008 | Mosebrook ........ | H05B 37/0209 315/291 |
| 2008/0258650 A1* | 10/2008 | Steiner ............... | H05B 37/0254 315/291 |
| 2010/0138067 A1 | 6/2010 | Mosebrook et al. | |
| 2010/0145545 A1 | 6/2010 | Mosebrook et al. | |

(Continued)

OTHER PUBLICATIONS

Title: Datasheet:ZM5202, Author Silicon Labs, pp. 1-42, Publication: Mar. 2018.*

*Primary Examiner* — Wei (Victor) Chan
(74) *Attorney, Agent, or Firm* — Thomas J. Germinario

(57) ABSTRACT

A Z-wave controlled smart switch for multi-way switch circuits can be either an on/off switch or a dimmer switch. The Z-wave switch connects through two travelers to each of the fixed contacts of the remote switch. Depending on the position of the remote switch, the Z-wave switch alternately directs the line AC voltage, or dimmed line voltage, to either of the fixed contacts of the remote switch through either of two parallel hot terminals. The direction of AC voltage through the Z-wave switch is controlled by the Z-wave module through a relay or by bidirectional TRIACs or anti-series FETs. The Z-wave switch is operative to fully control the state of the load in any multi-way system regardless of the state of the remote switches and without replacing or rewiring the remote switches. The Z-wave module also uniquely integrates the smart switch microcontroller and RF communications functions in one unit and leverages the superior connectivity capabilities of the Z-wave technology.

6 Claims, 6 Drawing Sheets

(56) References Cited

U.S. PATENT DOCUMENTS

2013/0300314 A1   11/2013  Weda et al.
2014/0265897 A1*  9/2014  Taipale ................. H05B 37/02
                                                    315/200 R
2015/0098164 A1*  4/2015  Lenig ..................... H01H 47/18
                                                     361/185

* cited by examiner

Z-WAVE MULTI-WAY SWITCHES

FIELD OF INVENTION

The present invention relates to switches for electrical wiring systems having multi-way switches, and more particularly to electronic "smart" switches that can be substituted for conventional mechanical switches in such multi-way systems.

BACKGROUND OF THE INVENTION

With the advent of "smart home" systems, household lighting can be remotely controlled from within or outside the home through available wi-fi connections. Z-wave controllers are a particularly advantageous component of such systems, for several reasons. Due to their "mesh network" capabilities, each Z-wave device can act as a repeater and can directly communicate with other associated devices without going through a central hub. A Z-wave hub can interface with wi-fi and Bluetooth devices to enable remote control, including voice control, of lighting. Moreover, since available Z-wave modules incorporate both RF transceivers and microcontrollers, they provide in one unit both the communications link to other devices and the lighting control functions for connected multi-way switches.

In order to perform these functions, however, the Z-wave module must be constantly connected to an active low voltage DC power supply drawing from an AC line. This requirement is problematic in a conventional multi-way lighting circuit, in which no power is provided to any of the switches when power to the lighting load is turned off. Some prior art smart switches address this problem by pairing the smart switch with a specially designed remote switch, which increases the expense and difficulty of the installation. Other multi-way smart switch designs do not require replacement of the remote switches, but instead require rewiring so that the power to the smart switch can by-pass the remote switches when the load is powered off.

Another approach to this problem is disclosed in U.S. Pat. No. 8,212,425 of Mosebrook, et al., which is incorporated herein by reference. FIG. 5A of that patent depicts a smart dimmer (502) in which the power supply (520) is connected in series with the mechanical three-way remote switch (504) and lighting load (508) alternately through one of two diodes (522, 524), so that the power supply (520) alternately draws current through one of the two dimmed hot terminals (DH1 or DH2), depending on the A or B position of the remote switch (504) (column 12, lines 5-15). But this arrangement has the distinct disadvantage of interrupting current flow to the power supply when the remote switch (504) is transitioning between positions A and B or gets stuck in a "dead travel" position where the movable contact is not engaging either of the fixed contacts. The Mosebrook disclosure acknowledges that, because of space limitations, it's not feasible to incorporate into the power supply a sufficiently large storage capacitor to bridge these switch transitioning power interruptions (column 13, lines 14-44).

Therefore, there is a need, as yet not fully addressed by the prior art, for a smart multi-way switch that is reliably always powered on while the AC line is active. The present invention addresses this need, while also improving the efficiency of the smart switch by using a Z-wave module to integrate the switch's load control and communications functions.

SUMMARY OF THE INVENTION

The present invention implements a Z-wave controlled smart switch for multi-way switch circuits, including three-way, four-way, or higher. The Z-wave switch can be either an on/off switch or a dimmer switch. The Z-wave switch connects through two travelers to each of the fixed contacts of the remote switch (commonly designated as positions A and B in a three-way SPDT switch or positions A1 and B1 in a four-way DPDT switch).

Depending on the position of the remote switch, the Z-wave switch alternately directs the line AC voltage, or dimmed line voltage, to either of the fixed contacts of the remote switch through either of two parallel hot terminals. The direction of AC voltage through the Z-wave switch is controlled by the Z-wave module through a relay or by bidirectional TRIACs or anti-series FETs.

Unlike prior art smart switches, the power supply to the Z-wave module's microcontroller is connected across the AC line and neutral, in parallel connection with the remote switch and load, so that the power to the Z-wave module stays on regardless of any disconnects in the remote switch or load.

The Z-wave switch includes a current detection circuit, which detects current flow through the lighting load. For example, if the Z-wave switch is currently directing AC voltage to remote switch position A and the current detector is reading no flow through the load, the Z-wave module will respond to a remote activation signal by redirecting the AC voltage to the other traveler connected to remote switch position B. Conversely, if the current detector is reading a flow through the load when the remote switch is in position A, the Z-wave will respond to a subsequent remote de-activation signal by redirecting the AC voltage to remote switch position B.

Therefore, the Z-wave switch is operative to fully control the state of the load in any multi-way system regardless of the state of the remote switches and without replacing or rewiring the remote switches. The Z-wave module also uniquely integrates the smart switch microcontroller and RF communications functions in one unit and leverages the superior connectivity capabilities of the Z-wave technology.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
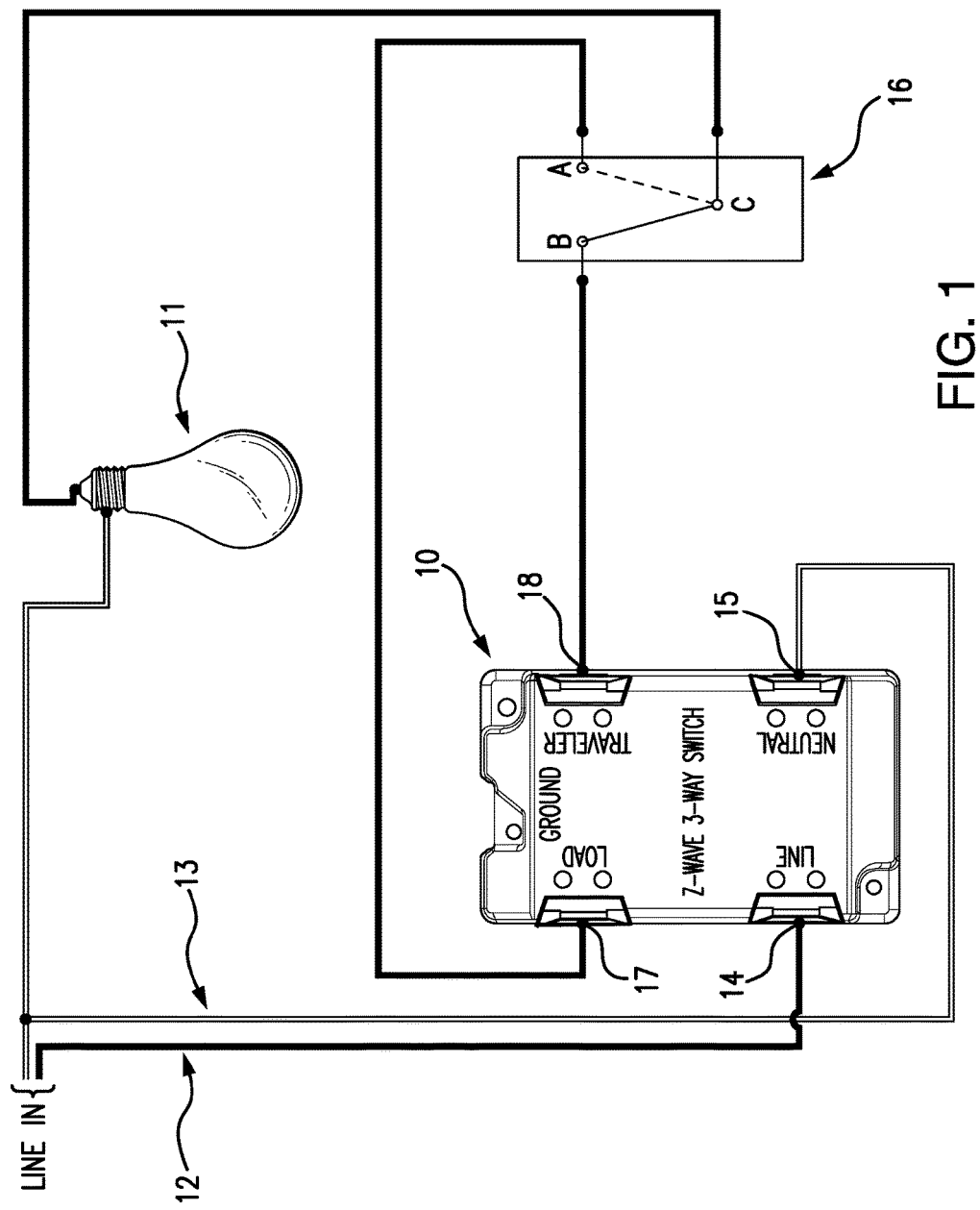
FIG. 1 is a schematic diagram of a Z-wave switch, according to one embodiment of the present invention, connected to a three-way remote switch and a lighting load.
Figure 2:
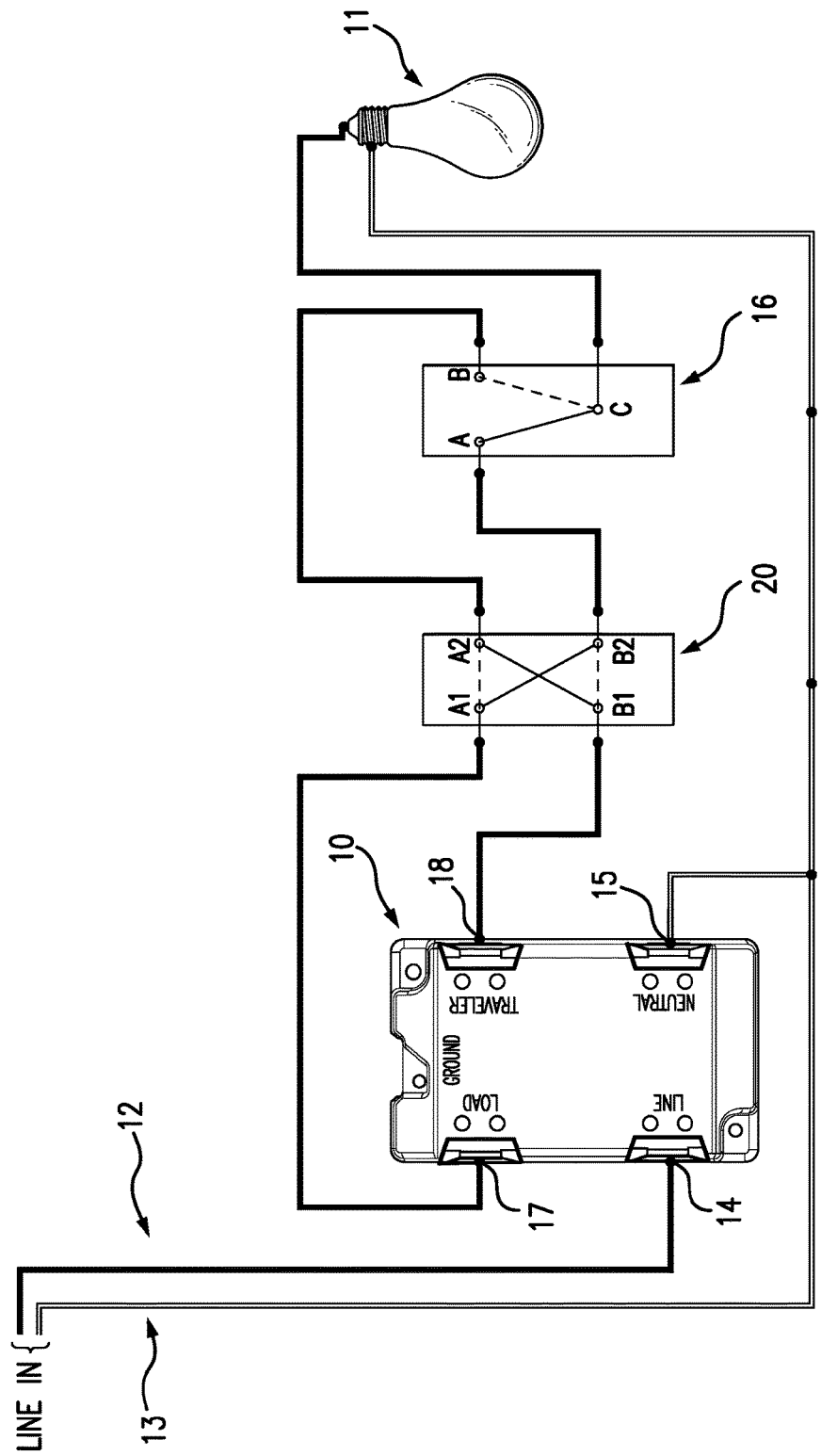
FIG. 2 is a schematic diagram of a Z-wave switch, according to one embodiment of the present invention, connected to a three-way remote switch and a lighting load through one intermediate four-way switch.
Figure 3:
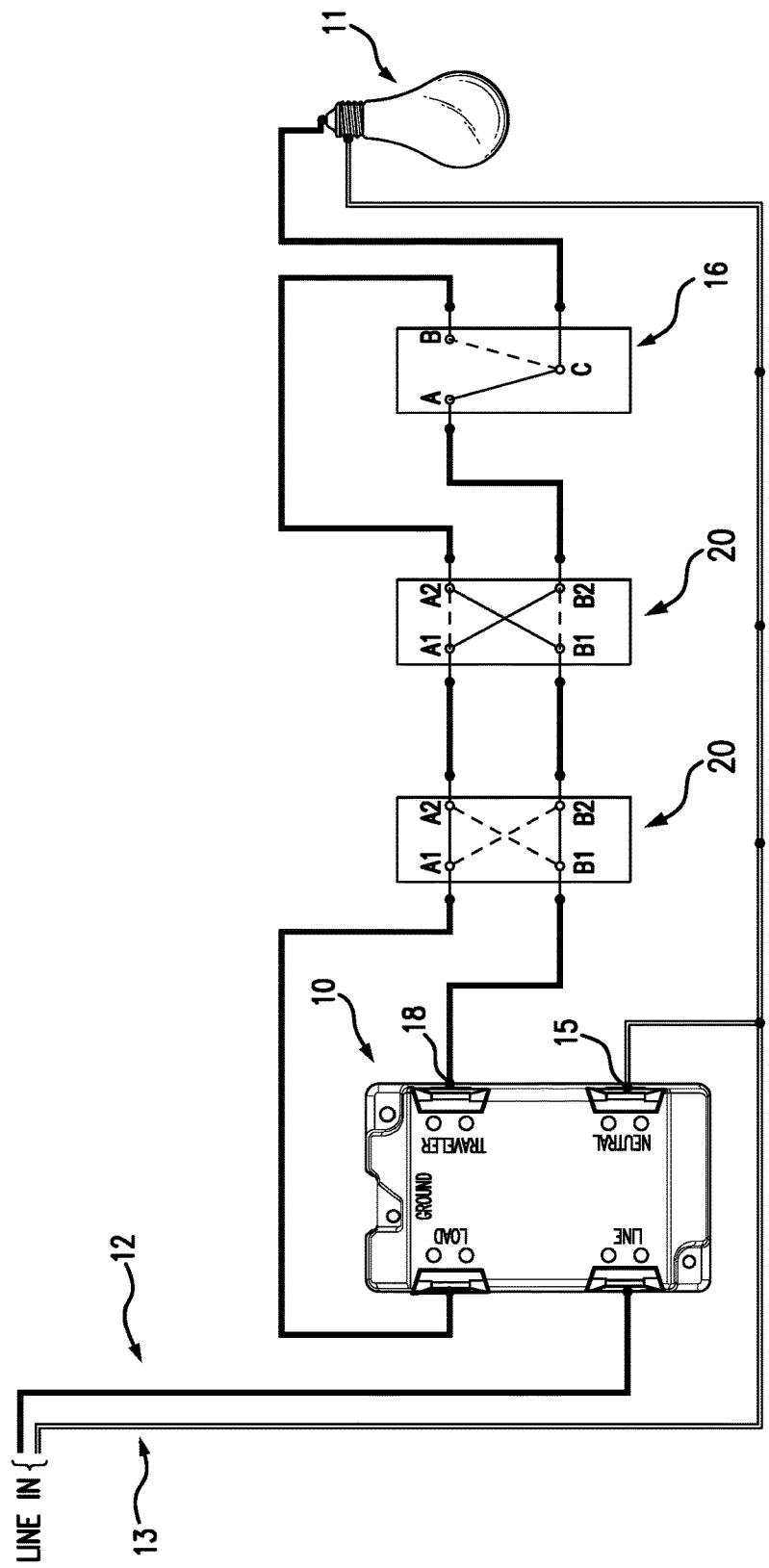
FIG. 3 is a schematic diagram of a Z-wave switch, according to one embodiment of the present invention, connected to a three-way remote switch and a lighting load through two intermediate four-way switches.

FIGS. 1-3 illustrate how the Z-wave switch of the present invention 10 can be connected to a lighting load 11 through one or more multi-way remote switches. The exemplary circuit shown in FIG. 1 comprises an AC hot line 12, an AC neutral line 13, which are respectively connected to the line terminal 14 and the neutral terminal 15 of the Z-wave switch 10. The Z-wave switch 10, in turn, is connected to the three-way remote switch 16 through load terminal 17 of the Z-wave switch 10, which connects to the first remote terminal "A" of the remote switch 16, and through the traveler terminal 18 of the Z-wave switch 10, which connects to the second remote terminal "B" of the remote switch 16. The common terminal "C" of the remote switch 16 is connected to the lighting load 11.

It should be noted that the Z-wave switch 10 is connected in parallel with the remote switch 16 and the load 11, so that the Z-wave switch 10 continues to draw AC power from the AC hot line 12 regardless of the status of the remote switch 16 or the load 11.

FIGS. 2-3 illustrate how the Z-wave switch 10 can be connected to the three-way remote switch 16 through one or more four-way intermediate switches 20.

Figure 4:
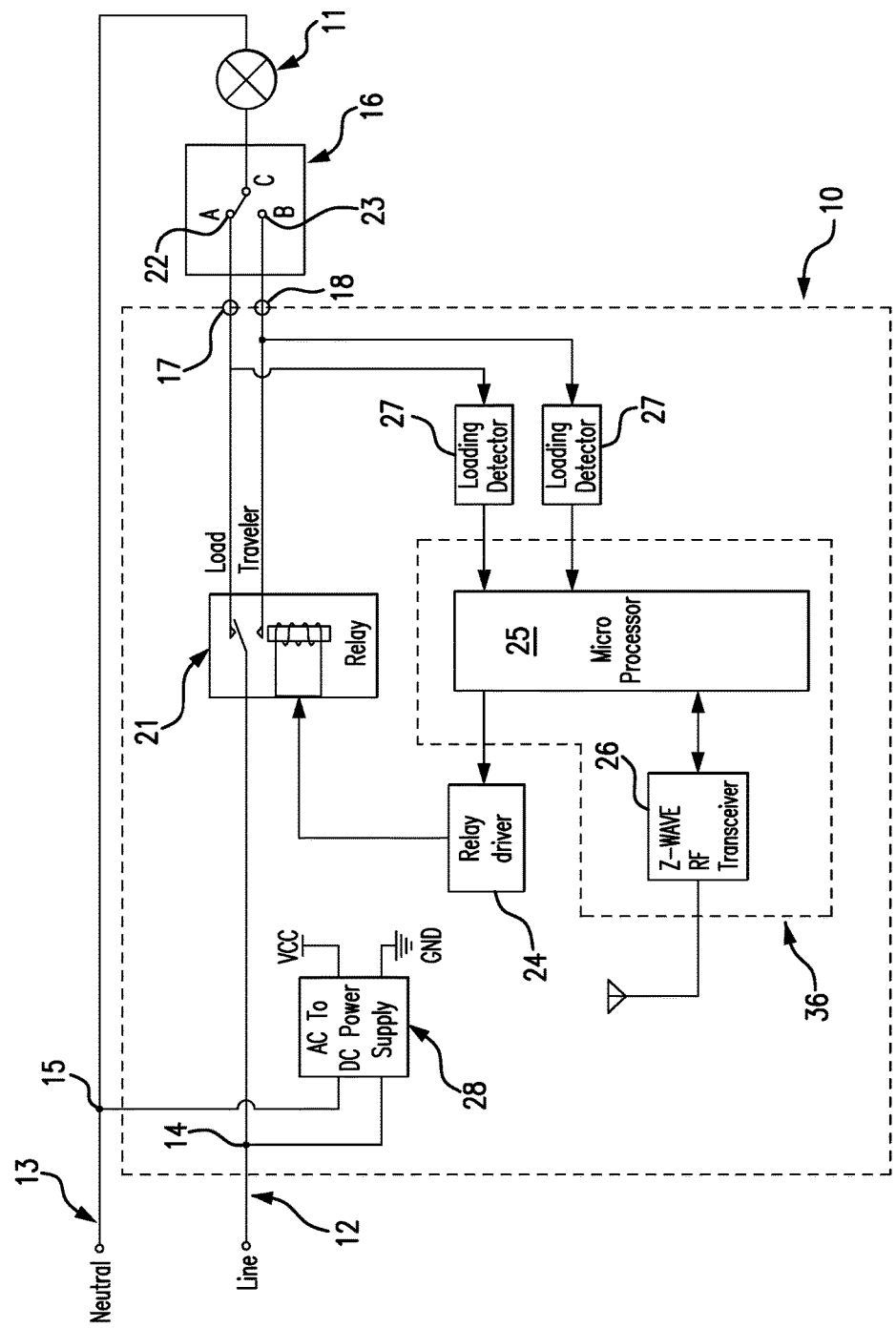
FIG. 4 is a block diagram of an exemplary on/off Z-wave switch using a relay switching circuit.

An exemplary on/off version of the Z-wave switch 10, without dimming, is depicted in FIG. 4. The Z-wave switch 10 is connecting through the AC line terminal 14, the neutral terminal 15, the load terminal 17, and the traveler terminal 18. An electromagnetic relay 21 operates to switch the AC line voltage between the load terminal 14, which is connected to the first remote terminal 22 of the remote switch 16, and the traveler terminal 18, which is connected to the second remote terminal 23 of the remote switch 16.

The relay 21 is controlled by a relay driver 24 based on signals sent to the relay driver 24 from the microprocessor switch controller 25. The switch controller 25, in turn, receives control commands from the Z-wave transceiver 26, based on remote RF control commands received by the Z-wave transceiver 26. The switch controller 25 also receives a load current detection signal from one or more current sensing elements 27, which operate to detect a load current flowing through the remote switch 16 to the electrical load 11.

The switch controller 25 operates to switch the control state of the relay 21 from the first control state, in which the line terminal 14 is electrically connected to the load terminal 17, as depicted in FIG. 1, to the second control state, in which the line terminal 14 is electrically connected to the traveler terminal 18, or conversely from the second control state to the first control state. The switch controller 25 electrically communicates the current control state of the relay 21 and the current status of the load current to the Z-wave transceiver 26, which is operable to transmit RF status messages incorporating this information to a remote user.

The switch controller 25 and the Z-wave transceiver 26 are powered by DC (VCC) converted from the line AC by a power supply 28. Since the power supply 28 is connected in parallel between the AC hot line 12 and the AC neutral line 13, it continues to supply DC power to the switch controller 25 and Z-wave transceiver 26 even when the remote switch 16 is in transition or an open circuit develops in the load 11.

Figure 5:
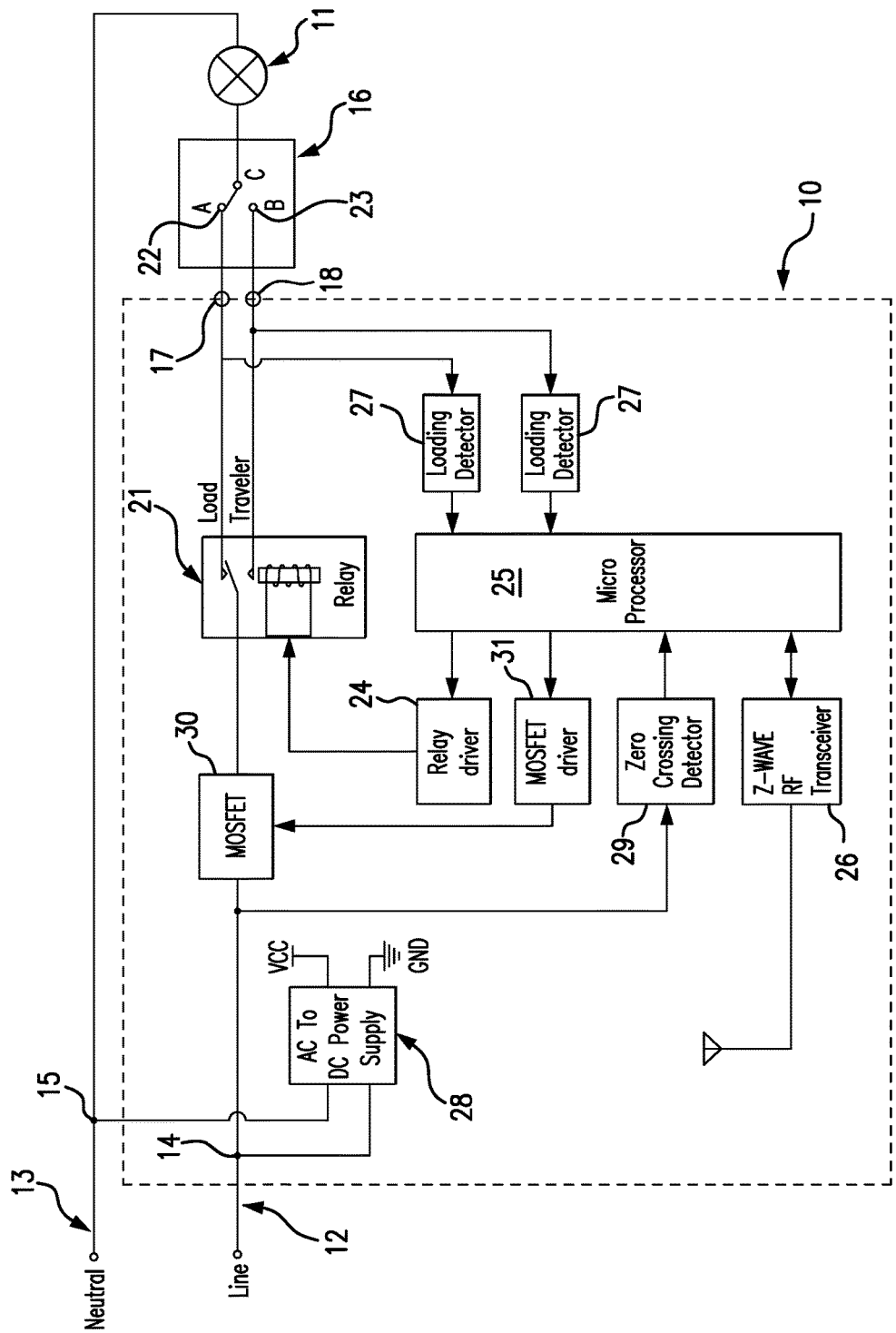
FIG. 5 is a block diagram of an exemplary Z-wave dimmer switch using a relay switching circuit and a MOSFET dimmer circuit.

Referring now to FIG. 5, an exemplary dimmer version of the Z-wave switch 10 is shown. The dimmer switch 10 comprises, in addition to the components described above for the on/off version, a zero-crossing detector 29 and a MOSFET (metal-oxide-semiconductor field-effect transistor) 30. The zero-crossing detector detects the zero-crossings of the line AC waveform, which are the times when the AC voltage transitions from positive to negative polarity or vice-versa at the beginning of each AC half-cycle. The zero-crossing detector 29 simultaneously transmits zero-crossing signals to the switch controller 25, which transmits phase control signals to the MOSFET 30 through a MOSFET driver circuit 31. In response to the phase control signals, the MOSFET 30 conducts AC power from the line terminal 14 to the relay 21 only during specified phase intervals, relative to the zero-crossings of the AC waveform, thereby enabling the controlled dimming of the lighting load 11.

Figure 6:
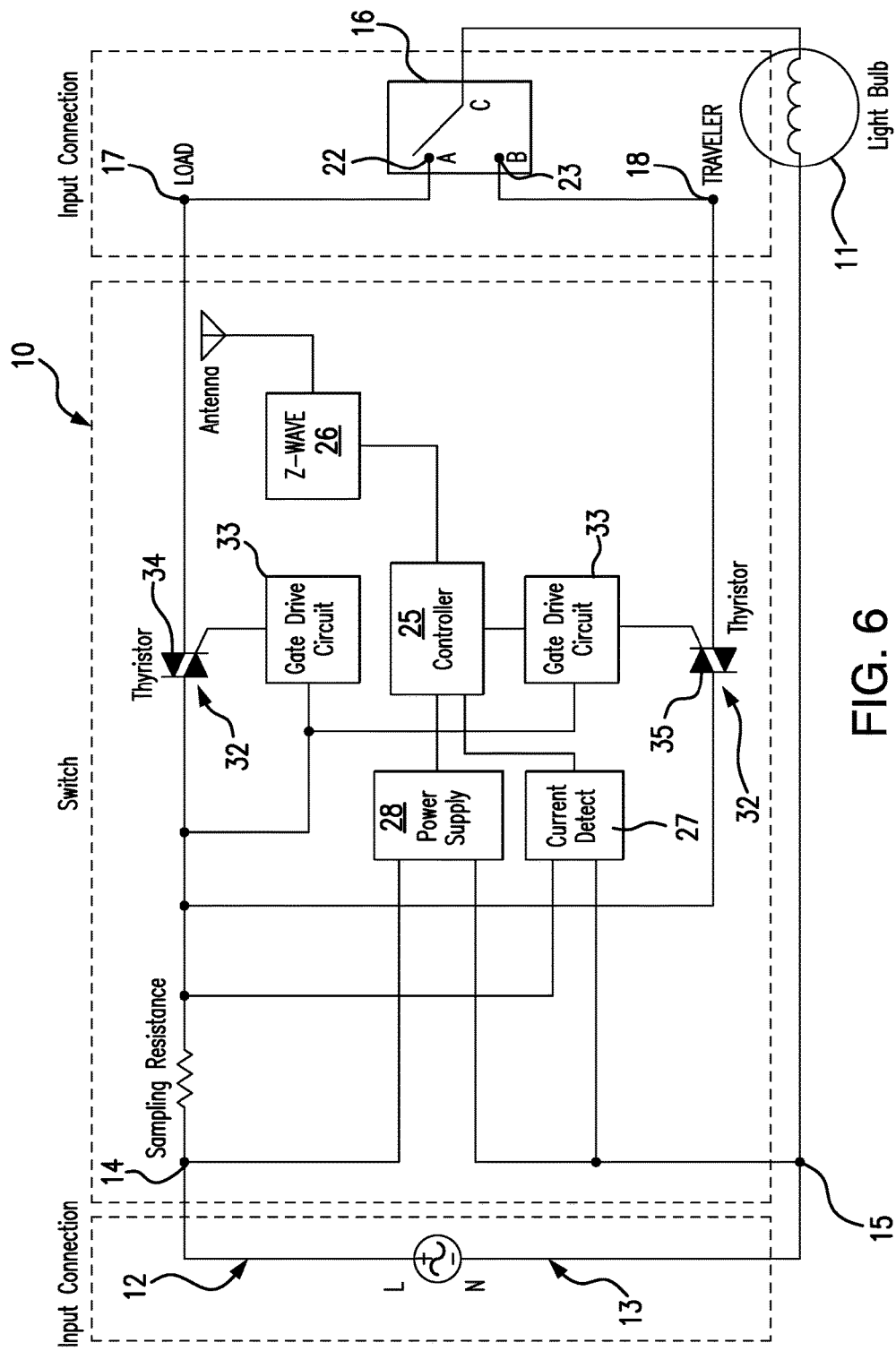
FIG. 6 is a block diagram of an exemplary on/off Z-wave switch using a semiconductor switching circuit.

Referring to FIG. 6, another exemplary on/off version of the Z-wave switch 10 is depicted. In this version, the conductive control system consists of a semiconductor switching circuit instead of the relay switching circuit shown in FIGS. 4-5. The semiconductor switching circuit comprises two semiconductor control elements 32, which can be a pair of bidirectional TRIACs (bilateral triode thyristors), as shown in FIG. 6, or a pair of FETs (field-effect transistors) in anti-series connection (as depicted in FIG. 5D of U.S. Pat. No. 8,212,425). In FIG. 6, each of the TRIACs 32 is controlled by the switch controller 25 through a gate drive circuit 33. In the first control state (line terminal 14 connected to load terminal 17), the first TRIAC 34 is conducting and the second TRIAC 35 is not. In the second control state (line terminal 14 connected to traveler terminal 18), the second TRIAC 35 is conducting and the first TRIAC 34 is not.

A dimmer version of the Z-wave switch 10 shown in FIG. 6 can be implemented by adding the zero-crossing detector 29 depicted in FIG. 5 and programming the switch controller 25 to switch the conducting TRIAC 32 to non-conducting during a designated portion of the AC cycle, thereby producing a diminished AC current and enabling controlled dimming of the lighting load 11.

In other embodiments of the present invention, the Z-wave transceiver 26 and the switch controller 25 are combined in a single Z-wave module 36, such as the ZM5202 Z-wave module produced by Sigma Designs.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A smart switch adapted to be electrically connected to a circuit comprising an AC power source, an AC hot line, an AC neutral line, an electrical load, and a three-way remote switch, the remote switch having a first remote terminal, a second remote terminal and a common terminal that is electrically connected to the electrical load, the remote switch further having a first position, in which the common terminal is electrically connected to the first remote terminal, and a second position, in which the common terminal is electrically connected to the second remote terminal, the smart switch comprising a line terminal adapted to be electrically connected to the AC hot line;

a neutral terminal adapted to be electrically connected to the AC neutral line;

a load terminal adapted to be electrically connected to the first remote terminal of the remote switch;

a traveler terminal adapted to be electrically connected to the second remote terminal of the remote switch;

a conductive control system, comprising a relay switching circuit, wherein the conductive control system has two control states, consisting of a first control state, in which the line terminal is electrically connected to the load terminal, and a second control state, in which the line terminal is electrically connected to the traveler terminal, and wherein the relay switching circuit comprises an electromagnetic relay switch electrically connected between the line terminal and the load terminal and between the line terminal and the traveler terminal, and wherein the relay switching circuit is switchable between the two control states, and wherein in the first control state, the relay switch electrically connects the line terminal to the load terminal and electrically disconnects the line terminal from the traveler terminal, and wherein in the second control state the relay switch electrically connects the line terminal to the traveler terminal and electrically disconnects the line terminal from the load terminal;

one or more current sensing elements electrically connected between the line terminal and the neutral terminal, or between the conductive control system and either or both of the load terminal and the traveler terminal, wherein the current sensing elements are operable to detect a status of a load current flowing through the remote switch to the electrical load and to transmit a load current detection signal;

a radio frequency (RF) Z-wave transceiver operable to receive remote RF control commands, and to electrically transmit the control commands, and to transmit RF status messages that report the status of the load current and the control state of the conductive control system;

a switch controller electrically connected to the Z-wave transceiver and to the current sensing elements and to the conductive control system, wherein the switch controller is operable, in response to the control commands from the Z-wave transceiver and to the load current detection signal from the current sensing elements, to switch, through a control driver circuit, the control states of the conductive control system from the first control state to the second control state, or from the second control state to the first control state; and a power supply, having an AC input side and a DC output side, wherein the AC input side is electrically connected between the line terminal and the neutral terminal, and wherein the DC output side is electrically connected to the switch controller and the Z-wave transceiver, and wherein the power supply converts and AC input from the AC input side to a DC output on the DC output side, and wherein the DC output side of the power supply is operable to supply the DC output to power the switch controller and the Z-wave transceiver.

2. The smart switch according to claim 1, wherein the conductive control system comprises the semiconductor switching circuit comprising two semiconductor control elements, each having two semiconductor states consisting of a conductive state and a non-conductive state, the conductive control elements comprising a first semiconductor control element, having as the semiconductor states a first conductive state and a first non-conductive state, wherein the first semiconductor control element is electrically connected between the line terminal and the load terminal, and further comprising a second semiconductor control element, having as the semiconductor states a second conductive state and a second non-conductive state, wherein the second semiconductor control element is electrically connected between the line terminal and the traveler terminal, and wherein the semiconductor switching circuit is switchable between the two control states, and wherein in the first control state, the first semiconductor control element is in the first conductive state and the second semiconductor control element is in the second non-conductive state, and wherein in the second control state, the first semiconductor control element is in the first non-conductive state and the second semiconductor control element is in the second conductive state, and wherein the switch controller is operable to switch the first semiconductor control element from the first non-conductive state to the first conductive state, so that a first line current flows from the line terminal to the load terminal, or from the first conductive state to the first non-conductive state, so that no current flows from the line terminal to the load terminal, and wherein the switch controller is operable to switch the second semiconductor control element from the second non-conductive state to the second conductive state, so that a second line current flows from the line terminal to the traveler terminal, or from the second conductive state to the second non-conductive state, so that no current flows from the line terminal to the traveler terminal.

3. The smart switch according to claim 1, further comprising a dimmer circuit, comprising a zero-crossing detector and a MOSFET, wherein the zero-crossing detector is electrically connected between the line terminal and the relay switching circuit and is operable to detect zero-crossings of an AC waveform from the AC power source and to simultaneously transmit zero-crossing signals to the switch controller, and wherein the switch controller, in response to the control commands from the Z-wave transceiver and the zero-crossing signals from the zero-crossing detector, transmits, through a MOSFET driver circuit, phase control signals to the MOSFET, which is electrically connected between the zero-crossing detector and the relay switching circuit, and wherein the phase control signals cause the MOSFET to conduct AC power from the line terminal to the relay switching circuit only during specified phase intervals, relative to the zero-crossings of the AC waveform, thereby enabling a controlled dimming of lighting comprising the electrical load.

4. The smart switch switch according to claim 2, further comprising a zero-crossing detector, which is electrically connected between the line terminal and the semiconductor switching circuit and in operable to detect zero-crossings of an AC waveform from the AC power source and to simultaneously transmit zero-crossing signals to the switch controller, wherein the switch controller is operable, in response to the RF control commands and the zero-crossing signals, to cause one of the semiconductor control elements which is in the conductive state to switch to the non-conductive state during a portion of an AC cycle, thereby producing a diminished AC current flowing to the load terminal or the traveler terminal, and thereby enabling a controlled dimming of lighting comprising the electrical load.

5. The smart switch according to either one of claim 1 or 3, wherein the Z-wave transceiver and the switch controller are combined within a single Z-wave module.

6. The smart switch according to claim 5, wherein the load terminal is adapted to be connected to the first remote terminal of the remote switch through one or more four-way intermediate switches, and wherein the traveler terminal is adapted to be connected to the second remote terminal of the remote switch through the one or more four-way intermediate switches.

\* \* \* \* \*